United States Patent
Gray, Jr.

(10) Patent No.: US 7,753,441 B1
(45) Date of Patent: Jul. 13, 2010

(54) FISHERMAN'S CHAIR AND ASSOCIATED METHOD

(76) Inventor: Oscar Gray, Jr., 9611 Surratts Manor Dr., Clinton, MD (US) 20735

( * ) Notice: Subject to any disclaimer, the term of this patent is extended or adjusted under 35 U.S.C. 154(b) by 140 days.

(21) Appl. No.: 12/077,471

(22) Filed: Mar. 19, 2008

Related U.S. Application Data (60) Provisional application No. 60/918,566, filed on Mar. 19, 2007.

(51) Int. Cl.
*A47C 7/62* (2006.01)

(52) U.S. Cl. .............................. 297/188.11; 297/188.01

(58) Field of Classification Search .............. 297/378.1, 297/16.1, 217.1, 188.11, 188.01, 188.19, 297/378.14, 51, 40, 38, 45; 248/538; 43/15, 43/27.2, 42.72, 54.1, 57.1, 21.2
See application file for complete search history.

(56) References Cited

U.S. PATENT DOCUMENTS

| | | | | |
|---|---|---|---|---|
| 1,027,012 A | * | 5/1912 | Stock et al. .................... 297/53 |
| 1,344,431 A | * | 6/1920 | Albertie ................. 297/440.11 |
| 1,604,108 A | * | 10/1926 | Antipas ........................ 297/51 |
| 1,963,708 A | * | 6/1934 | Marvin ......................... 297/31 |
| 2,009,918 A | * | 7/1935 | Grassi ...................... 280/43.24 |
| 2,816,871 A | * | 12/1957 | Fish ......................... 297/217.1 |
| 3,077,327 A | * | 2/1963 | Batie et al. ................... 248/520 |
| 3,381,998 A | * | 5/1968 | Cheshier et al. ............. 297/124 |
| 3,623,766 A | * | 11/1971 | Funk ...................... 297/188.01 |
| 4,012,861 A | * | 3/1977 | Gellatly ......................... 43/15 |
| 4,460,216 A | * | 7/1984 | Keller .................... 297/188.01 |
| 4,476,645 A | * | 10/1984 | Paarmann ....................... 43/15 |
| 5,188,442 A | * | 2/1993 | Harty et al. ............ 297/188.11 |
| 5,269,157 A | * | 12/1993 | Ciminelli et al. ............ 62/457.7 |
| 5,542,205 A | * | 8/1996 | Updike .......................... 43/15 |
| 5,937,567 A | * | 8/1999 | Elkins ........................ 43/21.2 |
| 6,042,180 A | * | 3/2000 | Lombardi .............. 297/188.11 |
| 6,088,946 A | * | 7/2000 | Simmons ....................... 43/15 |
| 6,301,820 B1 | * | 10/2001 | Rosa ............................. 43/15 |
| 6,340,205 B1 | * | 1/2002 | Battiston ..................... 297/24 |
| 6,435,614 B1 | * | 8/2002 | Gollahon ................. 297/344.1 |
| 6,478,371 B1 | * | 11/2002 | Clarke ................... 297/188.11 |
| 6,637,146 B2 | * | 10/2003 | Ernst .......................... 43/21.2 |
| 6,684,555 B1 | * | 2/2004 | Vela ............................. 43/15 |
| 6,808,231 B1 | * | 10/2004 | Hill .......................... 297/217.7 |
| 7,395,828 B1 | * | 7/2008 | Pulley ......................... 135/16 |
| 7,559,171 B2 | * | 7/2009 | Bateman ..................... 43/21.2 |
| 2002/0145316 A1 | * | 10/2002 | Oliver ..................... 297/217.1 |
| 2004/0040197 A1 | * | 3/2004 | Black ............................ 43/15 |
| 2004/0070241 A1 | * | 4/2004 | Ventimiglia et al. ...... 297/217.1 |
| 2007/0158982 A1 | * | 7/2007 | Pellinen ................. 297/188.01 |
| 2008/0060251 A1 | * | 3/2008 | Morris .......................... 43/15 |
| 2009/0072597 A1 | * | 3/2009 | Montpas .................. 297/217.1 |
| 2009/0084019 A1 | * | 4/2009 | Carnevali .................... 43/21.2 |

* cited by examiner

*Primary Examiner*—David Dunn
*Assistant Examiner*—James Alex (57) ABSTRACT

A multifunctional fisherman chair includes a chair with pivotally attached seat and back sections selectively articulated between folded and unfolded positions. Such a chair further has a support frame connected to the seat section and spaced from the back section respectively. Such a support frame is selectively adapted between collapsed and extended positions in such a manner that the support frame lays generally coplanar with the seat and back sections when adapted to the collapsed position. The present invention further includes a mechanism for holding the plurality of existing fishing rods adjacent to the seat section in such a manner that the existing fishing rods extend upwardly and forwardly therefrom. A mechanism is included for automatically notifying a user when a fish takes bait from at least one of the plurality of existing fishing rods.

11 Claims, 9 Drawing Sheets

FISHERMAN'S CHAIR AND ASSOCIATED METHOD

CROSS REFERENCE TO RELATED APPLICATIONS

This application claims the benefit of U.S. Provisional Application No. 60/918,566, filed Mar. 19, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fishing chairs and, more particularly, to a fisherman's chair for supporting a plurality of existing fishing rods during extended periods of time.

2. Prior Art

Due to the relative popularity of sport fishing, many devices exist for receiving and holding the handle of a fishing rod. Additionally, several devices exist wherein the fishing rod handle is supported within a pivotally mounted holder in conjunction with a fighting chair. These particular devices are especially prevalent in deep sea fishing applications. The basic premise behind these devices is that the fishing rod can be maintained in the holder while setting the hook in the fish's mouth and further reeling the fish in.

One prior art device shows a fighting chair that includes a pivotally attached rod holder. The fighting chair is collapsible and attaches to the gunwale of a boat. While well suited to boat applications, such as deep sea fishing, this fighting chair will not work for bank fishing. Further, to modify the fighting chair to make it usable for bank fishing would provide for an expensive and cumbersome apparatus that would not meet the needs of the bank fisherman. Another prior art example shows a cylindrical fishing rod holder that is connected to a base by a standard hinge. In use, the holder is secured to a typical chair by the weight of the fisherman. The fisherman simply inserts the base between his legs and sits on it. A problem with this device is that it is incapable of supporting a fishing rod when left unattended. One of the primary functions of any fishing rod holder is to support, in a fishing position, an unattended fishing pole. The fishing rod holder only serves to provide a pivotal support for the handle of a fishing rod, and is best suited for use with a chair having a rigid seat.

U.S. Pat. No. 6,681,517 to Solomon discloses a fishing rod holder for mounting on a pedestal of and under a seat of a fishing chair carried by a deck of a boat. The fishing rod holder provides for retaining one or more fishing rods in a variety of angularly oriented positions, such as a storage position and a position where the fishing lines are cast in the water. The holder is formed as an open frame defined by a top plate, a parallel bottom plate and a pair or more side plates extending between the top plate and the bottom plate. Openings in the top and bottom plates allow sliding of the holder on the pedestal of the fishing chair. Tubular members are secured on angular braces connecting the top plate(s) with the side plates. The tubular members receive ends of fishing rod handles when the fishing rods are oriented in the operational position. Unfortunately, this prior art example does not eliminate the need to stand and hold a pole while waiting for a bite.

U.S. Pat. No. 6,047,491 to De Busk discloses a fishing utility apparatus which includes a base plate, at least a pair of upstanding plates mounted on the base plate and a top plate mounted on the upstanding plates. Also included is a plurality of storage openings formed in the apparatus for storing a plurality of rods in a prone orientation. Next provided is a plurality of supporting openings formed in the apparatus for supporting a plurality of rods in an erected orientation. Unfortunately, this prior art example is not designed to improve the rate of fish caught by a consumer by providing a more stable and efficient means of managing poles in a comfortable manner.

Accordingly, the present invention is disclosed in order to overcome the above noted shortcomings. The multifunctional fisherman chair is convenient and easy to use, lightweight yet durable in design, and designed for supporting a plurality of existing fishing rods during extended periods of time. The present invention is simple to use, inexpensive, and designed for many years of repeated use.

BRIEF SUMMARY OF THE INVENTION

In view of the foregoing background, it is therefore an object of the present invention to provide an apparatus for supporting a plurality of existing fishing rods during extended periods of time. These and other objects, features, and advantages of the invention are provided by a multifunctional fisherman chair.

A multifunctional fisherman chair includes a chair with pivotally attached seat and back sections selectively articulated between folded and unfolded positions. Such a chair further has a support frame effectively connected to the seat section and spaced from the back section respectively. Such a support frame is selectively adapted between collapsed and extended positions in such a manner that the support frame lays generally coplanar with the seat and back sections when adapted to the collapsed position. The support frame includes first and second pivotally connected leg members with respective linear top sides directly mated with linear anterior and posterior sides of the seat section and a rectilinear stabilizing brace with axially opposed ends directly and statically conjoined with oppositely disposed longitudinal sides of the second leg member. The support frame is maintained at the extended position while the seat and back sections are pivotally adapted between the folded and unfolded positions respectively.

The chair further includes a plurality of brackets directly coupled to the seat and back sections, and a plurality of straps directly tethered to the seat and back sections for conveniently preventing the back section from pivoting beyond a predetermined position with respect to the seat section.

The present invention further includes a mechanism for holding the plurality of existing fishing rods adjacent to the seat section in such a manner that the existing fishing rods advantageously extend upwardly and forwardly therefrom. Such a holding mechanism includes a plurality of tubular sleeves pivotally coupled to laterally disposed outer sides of the seat section. Each of such tubular sleeves has an open top end and a closed bottom end situated subjacent to the seat section such that a longitudinal length of the tubular sleeves is angularly offset from a horizontal plane defined along the seat section. The present invention further includes a plurality of cup holders attached to the seat section, and an umbrella attached to the back section.

The present invention further includes a mechanism for automatically notifying a user when a fish takes bait from at least one of the plurality of existing fishing rods. Such an automatic notifying mechanism is effectively configured in such a manner that the user is able to quickly identify which one of the existing fishing rods has been accessed by the fish. The automatic notifying mechanism is coupled to the tubular sleeves and an underside of the seat section respectively while remaining spaced from the support frame and the back section respectively. The automatic notifying mechanism further includes a first plurality of rectilinear guide tracks attached to the underside of a first half of the seat section, a first plurality of rectilinear rods adjustably engaged with the first guide tracks respectively and displaced along the first half of the seat section, and a first plurality of deformably resilient spring members with opposed first and second ends respectively.

Each of the first ends of the first plurality of spring members are statically conjoined directly to the closed end of a first one of the tubular sleeves. The second ends of the first plurality of spring members are statically conjoined directly to the first plurality of rods respectively. The first plurality of rods linearly reciprocate along mutually exclusive linear travel paths defined along the first plurality of guide tracks respectively when a first one of the existing fishing rods is jerked back and forth. The first plurality of spring members conveniently return to corresponding equilibrium positions after the first existing fishing rod is removed from the first tubular sleeve.

The automatic notifying mechanism further includes a second plurality of rectilinear guide tracks attached to a second half of the seat section. The first and second halves of the seat section are mutually exclusive and non-overlapping. The mechanism further includes a second plurality of rectilinear rods adjustably engaged with the second plurality of guide tracks respectively. A second plurality of deformably resilient spring members advantageously has opposed first and second ends respectively, and each of the first ends of the second plurality of spring members are statically conjoined directly to the closed end of a second one of the tubular sleeves.

The second ends of the second plurality of spring members are statically conjoined directly to the second plurality of the rods respectively. The second plurality of rods linearly reciprocate along mutually exclusive linear travel paths defined along the second plurality of guide tracks respectively when a second one of the existing fishing rods is jerked back and forth. The second plurality of spring members return to corresponding equilibrium positions after the second existing fishing rod is removed from the second tubular sleeve.

A method for supporting a plurality of existing fishing rods during extended periods of time includes the steps of: providing a chair with pivotally attached seat and back sections; selectively articulating the seat and back sections between folded and unfolded positions as needed; providing and connecting a support frame to the seat section by spacing the support frame from the back section; selectively adapting the support frame between collapsed and extended positions as needed such that the support frame lays generally coplanar with the seat and back sections when adapted to the collapsed position; holding the plurality of existing fishing rods adjacent to the seat section in such a manner that the existing fishing rods extend upwardly and forwardly therefrom; providing and attaching a plurality of cup holders to the seat section; providing and attaching an umbrella to the back section; and maintaining the support frame at the extended position while the seat and back sections are pivotally adapted between the folded and unfolded positions respectively.

The method further includes the steps of: providing and pivotally coupling a plurality of tubular sleeves to laterally disposed outer sides of the seat section; and situating closed bottom ends of each of the tubular sleeves subjacent to the seat section by angularly offsetting a longitudinal length of the tubular sleeves from a horizontal plane defined along the seat section.

The method further includes the steps of: automatically notifying a user when a fish takes bait from at least one of the plurality of existing fishing rods such that the user is able to quickly identify which one of the existing fishing rods has been accessed by the fish.

The method further includes the steps of: providing and attaching a first plurality of rectilinear guide tracks to the underside of a first half of the seat section; providing and adjustably engaging a first plurality of rectilinear rods with the first guide tracks respectively by displacing the first plurality of rectilinear rods along the first half of the seat section; and providing a first plurality of deformably resilient spring members with opposed first and second ends respectively; statically conjoining each of the first ends of the first plurality of spring members directly to the closed end of a first one of the tubular sleeves; statically conjoining the second ends of the first plurality of spring members directly to the first plurality of rods respectively; when a first one of the existing fishing rods is jerked back and forth, linearly reciprocating the first plurality of rods along mutually exclusive linear travel paths defined along the first plurality of guide tracks respectively; and after the first existing fishing rod is removed from the first tubular sleeve, returning the first plurality of spring members to corresponding equilibrium positions.

The method further includes the steps of: providing and attaching a second plurality of rectilinear guide tracks to a second half of the seat section in such a manner that the first and second halves of the seat section is mutually exclusive and non-overlapping; providing and adjustably engaging a second plurality of rectilinear rods with the second plurality of guide tracks respectively; providing a second plurality of deformably resilient spring members with opposed first and second ends respectively; statically conjoining each of the first ends of the second plurality of spring members directly to the closed end of a second one of the tubular sleeves; statically conjoining the second ends of the second plurality of spring members directly to the second plurality of the rods respectively; when a second one of the existing fishing rods is jerked back and forth, linearly reciprocating the second plurality of rods along mutually exclusive linear travel paths defined along the second plurality of guide tracks respectively; and after the second existing fishing rod is removed from the second tubular sleeve, returning the second plurality of spring members to corresponding equilibrium positions.

The method further includes the steps of: providing and coupling a plurality of brackets directly to the seat and back sections; and providing and tethering a plurality of straps directly to the seat and back sections for preventing the back section from pivoting beyond a predetermined position with respect to the seat section.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 6 is a top plan view of the multi-functional fisherman chair, as seen in

FIG. 2;

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-9 by the reference numeral 10 and is intended to provide a multifunctional fisherman chair that notifies a user when a fish has nibbled on the bait of at least one fishing pole. It should be understood that the apparatus 10 may be used in many different environments and should not be limited to use with only lake or river fishing events, for example.

Referring initially to FIGS. 1-9, a multifunctional fisherman chair 10 includes a chair 20 with pivotally attached seat and back sections 21, 22 selectively articulated between folded and unfolded positions. Such a chair 20 further has a support frame 23 connected to the seat section 21 and spaced from the back section 22 respectively. Such support frame 23 is selectively adapted between collapsed and extended positions in such a manner that the support frame 23 lays generally coplanar with the seat and back sections 21, 22 when adapted to the collapsed position. The support frame 23 includes first and second pivotally connected leg members 24, 25 with respective linear top sides 26 directly mated, without the use of intervening elements, with linear anterior and posterior sides 27, 28 of the seat section 21 and a rectilinear stabilizing brace 29 with axially opposed ends 30 directly and statically conjoined, without the use of intervening elements, with oppositely disposed longitudinal sides 31 of the second leg member 25. The support frame 23 is maintained at the extended position while the seat and back sections 21, 22 are pivotally adapted between the folded and unfolded positions respectively.

The chair 20 further includes a plurality of brackets 32 directly coupled, without the use of intervening elements, to the seat and back sections 21, 22, and a plurality of straps 33 directly tethered, without the use of intervening elements, to the seat and back sections 21, 22 for preventing the back section 22 from pivoting beyond a predetermined position with respect to the seat section 21. The chair 20 is adaptable between extended and collapsed positions in order to provide for convenient portability and storage.

Referring in particular to FIGS. 1, 2, 4, 7 and 8, the present invention 10 further includes a mechanism 34 for holding a plurality of existing fishing rods (not shown) adjacent to the seat section 21 in such a manner that the existing fishing rods extend upwardly and forwardly therefrom. Such a holding mechanism 34 includes a plurality of tubular sleeves 35 pivotally coupled to laterally disposed outer sides of the seat section 21 by hinges 90. Each of such tubular sleeves 35 has an open top end 36 and a closed bottom end 37 situated subjacent to the seat section 21 which is important such that a longitudinal length of the tubular sleeves 35 is angularly offset from a horizontal plane defined along the seat section 21 based upon a weight and operating force of a fishing pole house therein. The present invention 10 further includes a plurality of cup holders 38 attached to the seat section 21, and an umbrella 39 attached to the back section 22. The cup holders 38 and umbrella 39 enable a user to enjoy hands-free relaxation during recreational activities.

Referring to FIGS. 1-9, the present invention 10 further includes a mechanism 40 for automatically notifying a user when a fish takes bait from at least one of the plurality of existing fishing rods. Such an automatic notifying mechanism 40 is configured in such a manner that the user is able to quickly identify which one of the existing fishing rods has been accessed by the fish. The automatic notifying mechanism 40 is coupled to the tubular sleeves 35 and an underside of the seat section 21 respectively while remaining spaced from the support frame 23 and the back section 22 respectively.

The automatic notifying mechanism 40 includes a first plurality of rectilinear guide tracks 41 attached to the underside of a first half 42 of the seat section 21 (as perhaps best shown in FIGS. 2, 7 and 8); a first plurality of rectilinear rods 43 adjustably engaged with the first guide tracks 41 respectively and displaced along the first half 42 of the seat section 21; and a first plurality of deformably resilient spring members 44 with opposed first and second ends 45, 46 respectively.

Each of the first ends 45 of the first plurality of spring members 44 are statically conjoined directly, without the use of intervening elements, to the closed end 37 of a first one of the tubular sleeves 35. The second ends 46 of the first plurality of spring members 44 are statically conjoined directly, without the use of intervening elements, to the first plurality of rods 43 respectively. The first plurality of rods 43 linearly reciprocate along mutually exclusive linear travel paths defined along the first plurality of guide tracks 41 respectively when a first one of the existing fishing rods is jerked back and forth (as perhaps best shown in FIG. 8). The first plurality of spring members 44 return to corresponding equilibrium positions after the first existing fishing rod is removed from the first tubular sleeve 35.

Figure 1:
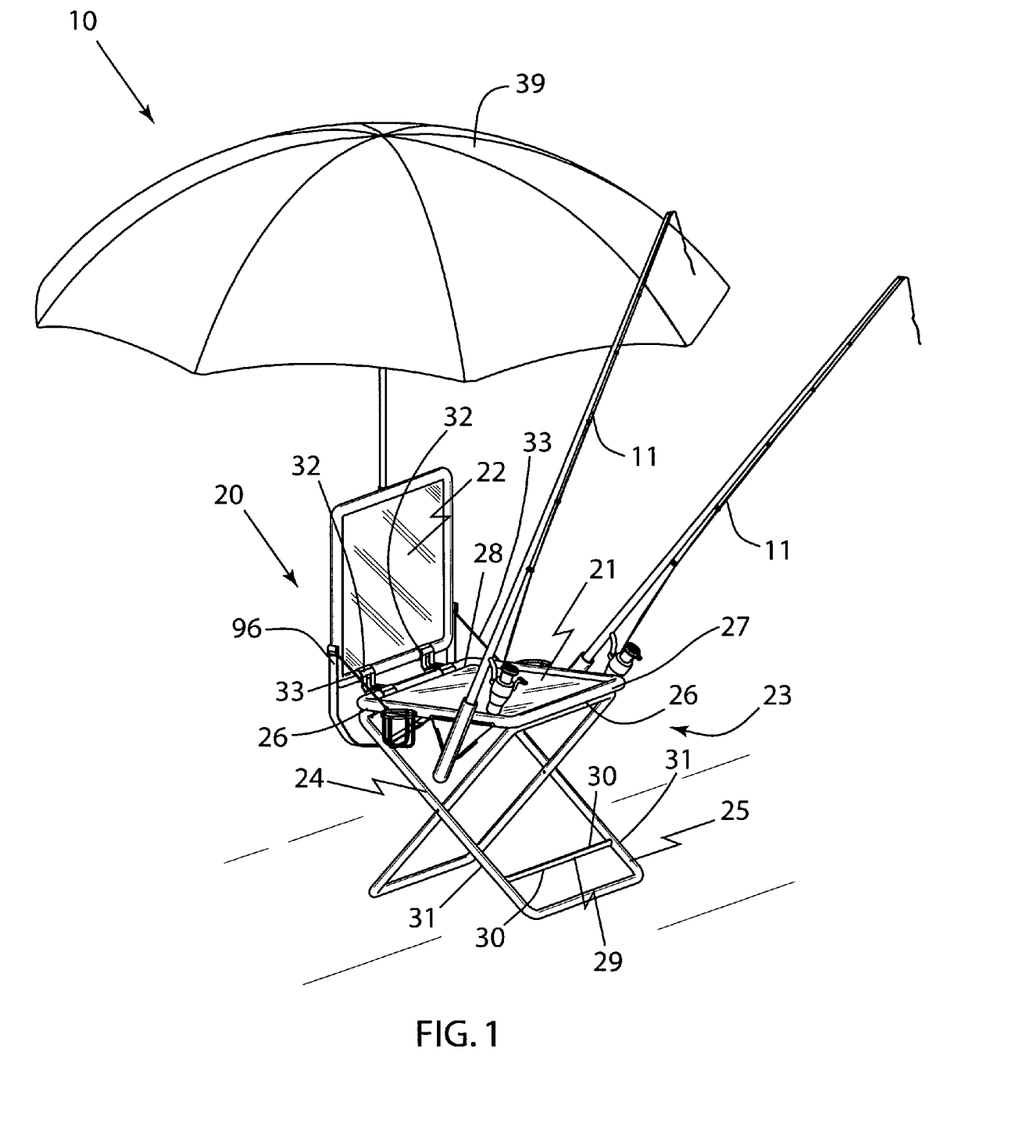
FIG. 1 is a perspective view of a multi-functional fisherman chair, in accordance with the present invention.
Figure 2:
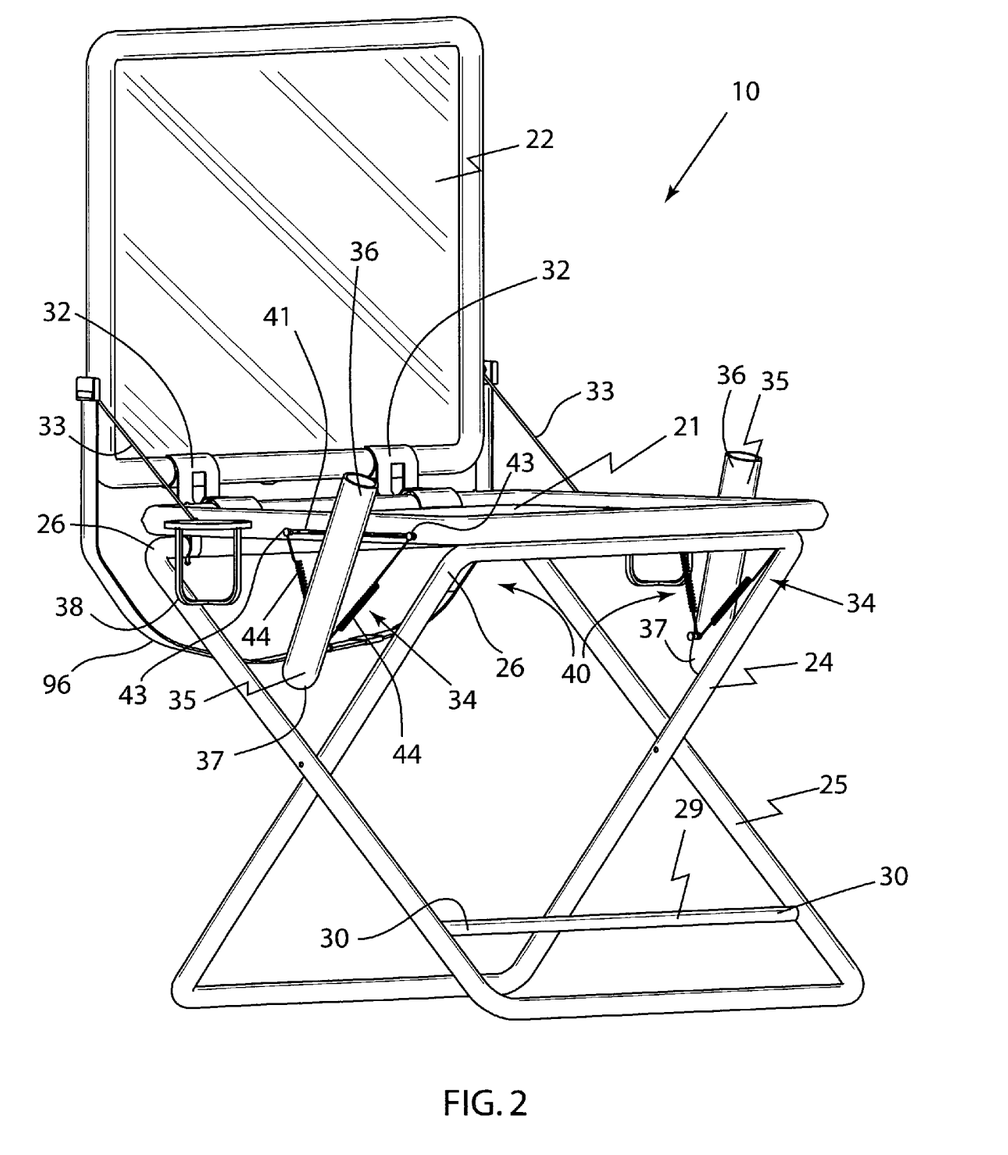
FIG. 2 is an enlarged perspective view of the multi-functional fisherman chair, as seen in FIG. 1, without the umbrella attached thereto.
Figure 3:
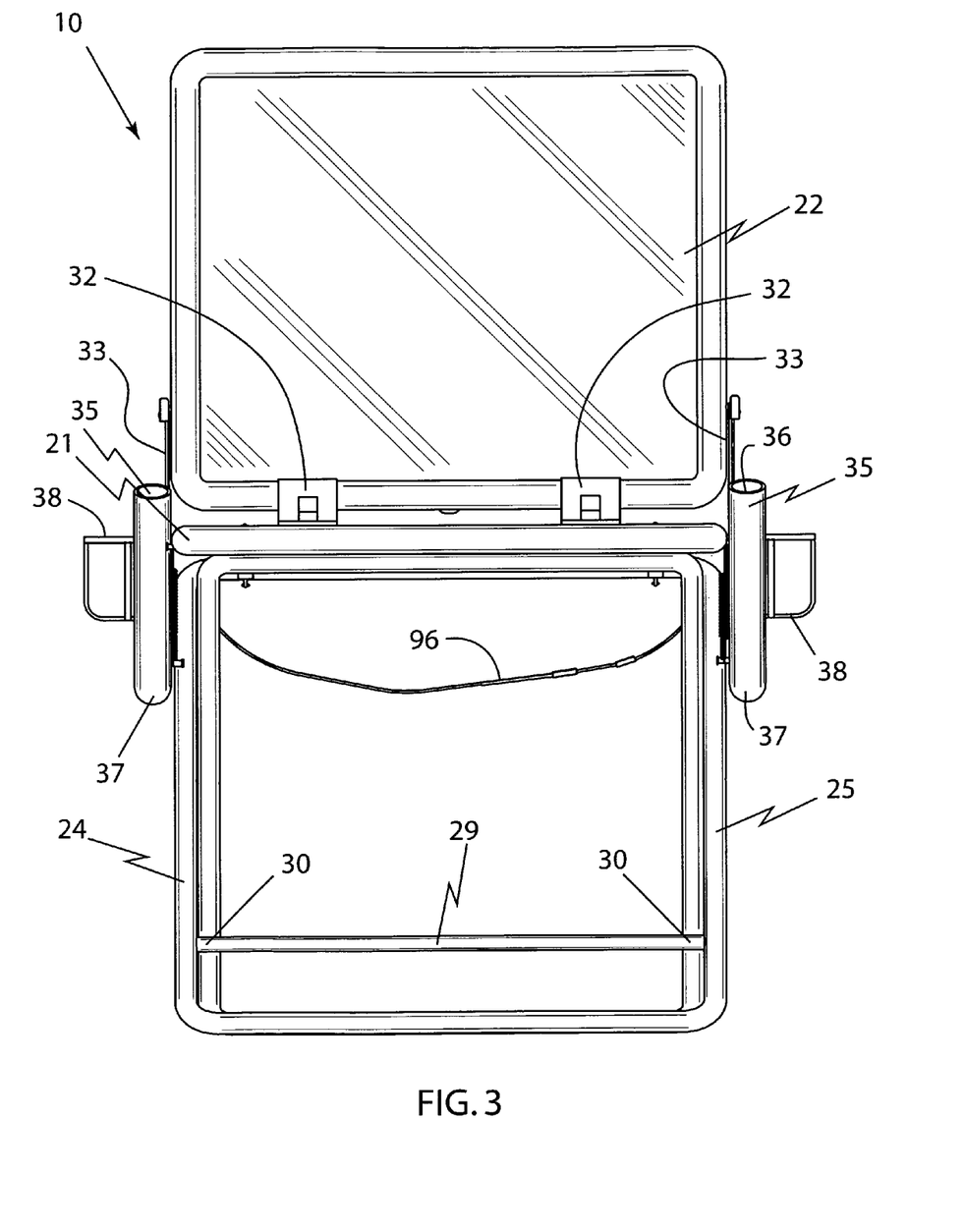
FIG. 3 is a front elevational view of the multi-functional fisherman chair, as seen in FIG. 2.
Figure 4:
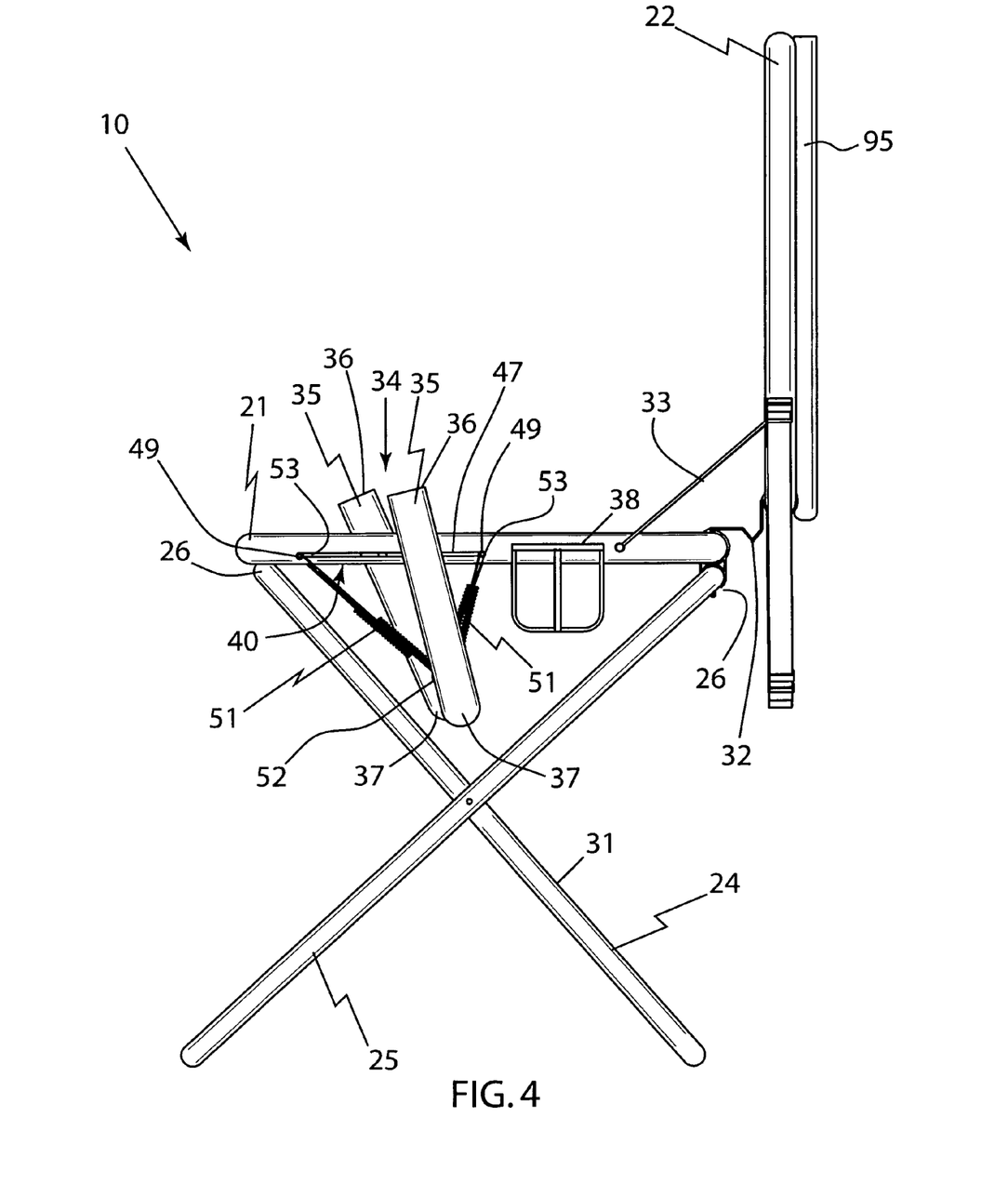
FIG. 4 is a left side elevational view of the multi-functional fisherman chair, as seen in FIG. 2.
Figure 5:
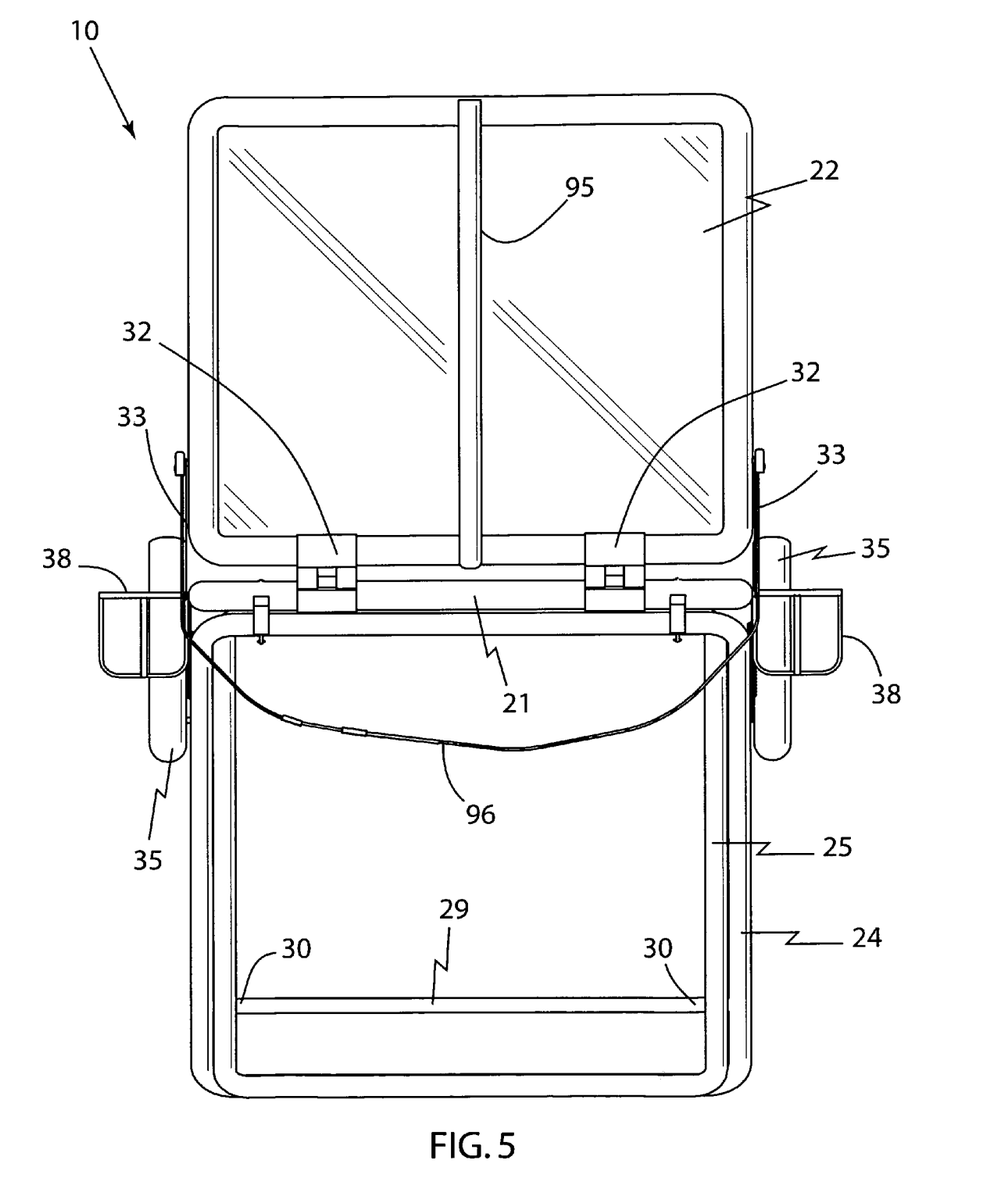
FIG. 5 is a rear elevational view of the multi-functional fisherman chair, as seen in FIG. 2.
Figure 6:
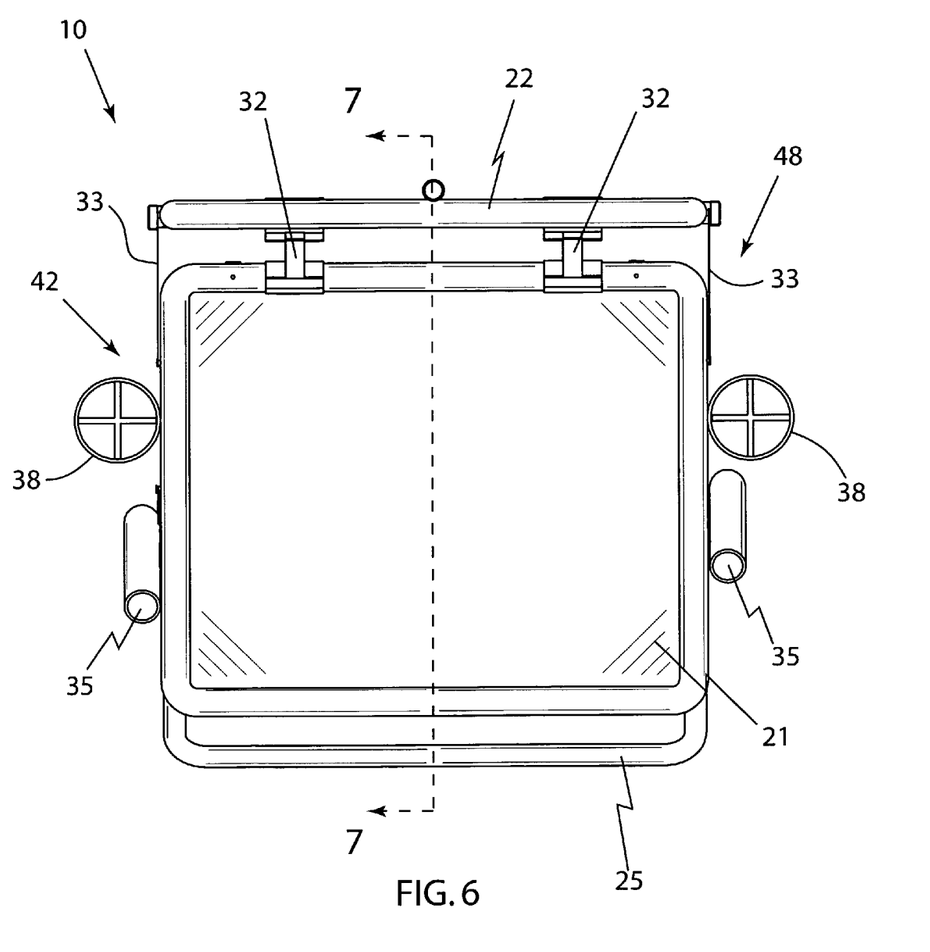
Figure 7:
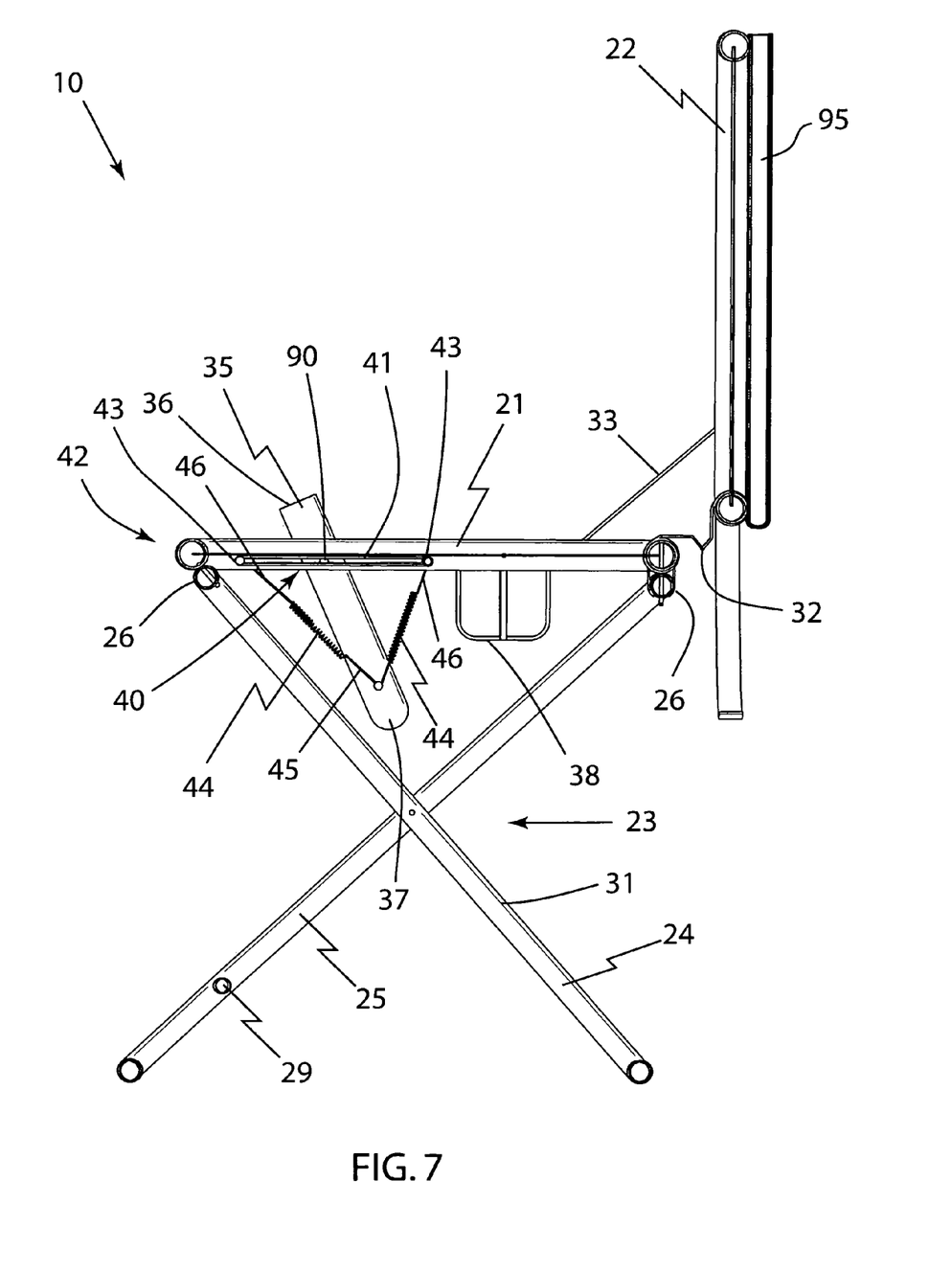
FIG. 7 is a cross sectional view of the multi-functional fisherman chair, taken along line 7-7, as seen in FIG. 6.
Figure 8:
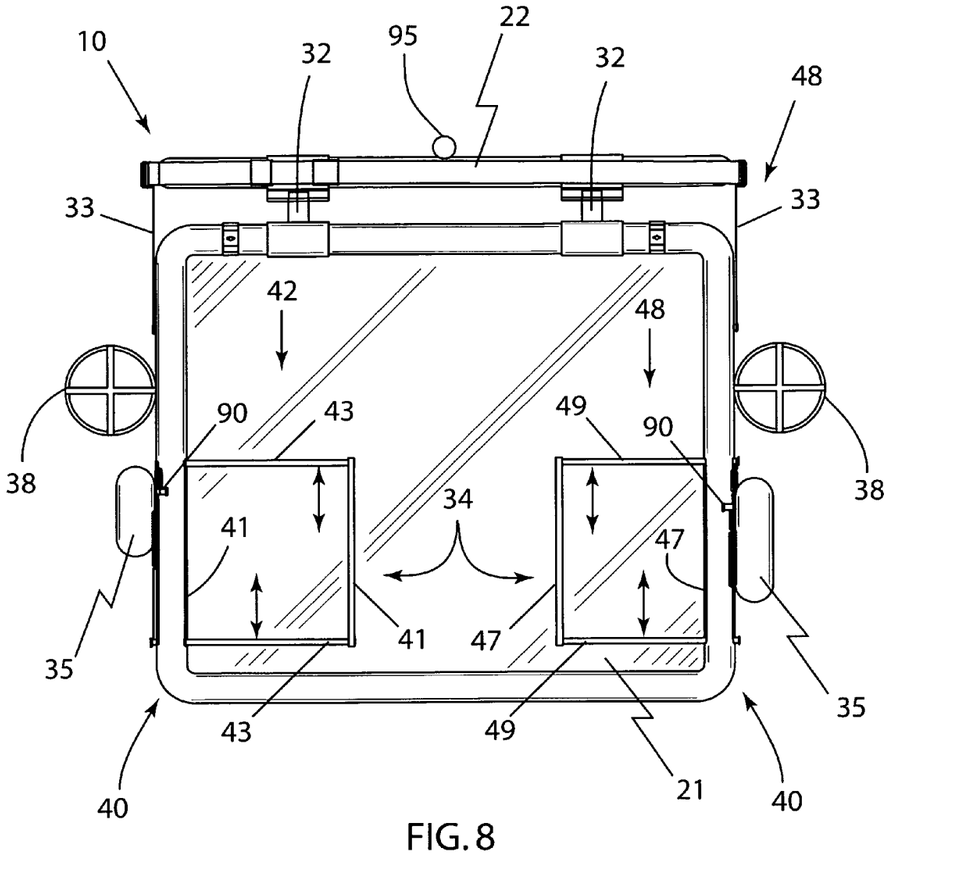
FIG. 8 is a bottom plane view of the multi-functional fisherman chair as shown in FIG. 2, which illustrate the movement of the rods each set of guide tracks, in accordance with the present invention.
Figure 9:
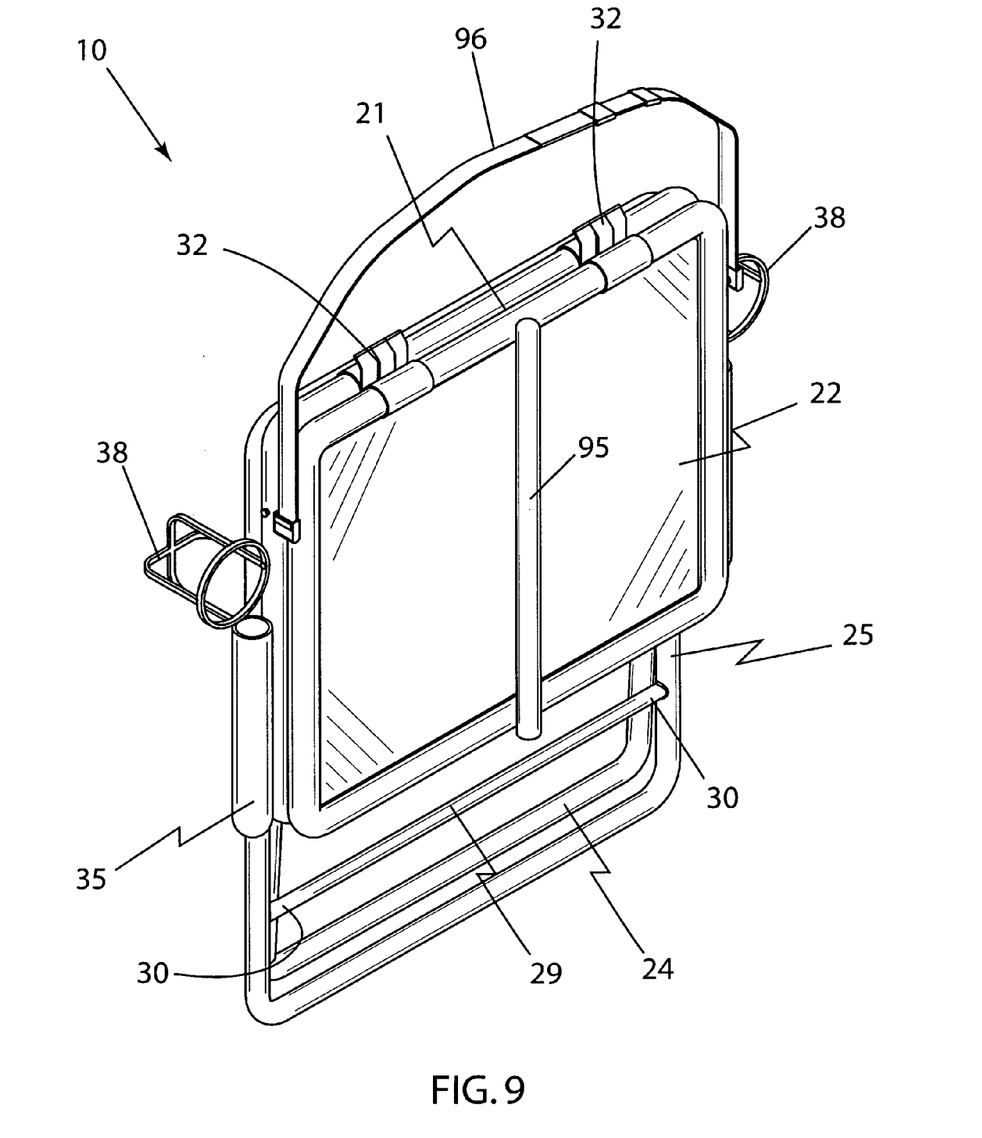
FIG. 9 is a perspective view showing the multi-functional fisherman chair at a collapsed position.

Referring to FIGS. 4 and 8, the automatic notifying mechanism 40 further includes a second plurality of rectilinear guide tracks 47 attached to a second half 48 of the seat section 21. The first and second halves 42, 48 of the seat section 21 are mutually exclusive and non-overlapping. The mechanism 40 further includes a second plurality of rectilinear rods 49 adjustably engaged with the second plurality of guide tracks 47 respectively. A second plurality of deformably resilient spring members 51 has opposed first and second ends 52, 53 respectively, and each of the first ends 52 of the second plurality of spring members 51 are statically conjoined directly, without the use of intervening elements, to the closed end 37 of a second one of the tubular sleeves 35 (as best shown in FIG. 4). The second ends 53 of the second plurality of spring members 51 are statically conjoined directly, without the use of intervening elements, to the second plurality of the rods 49 respectively.

Again with reference to FIG. 4, the second plurality of rods 49 linearly reciprocate along mutually exclusive linear travel paths defined along the second plurality of guide tracks 47 respectively when a second one of the existing fishing rods is jerked back and forth. The second plurality of spring members 51 return to corresponding equilibrium positions after the second existing fishing rod is removed from the second tubular sleeve. 35

The present invention 10 further includes a portable folding chair that has a pair of fishing rod holders, shaped as tubular sleeves, directly and pivotally attached thereto via hinges 90, without the use of intervening elements. The chair is compact, and may have a metal framework with a canvas back portion and cushion foam seat, for example. In one embodiment, the canvas back and foam seat each may measure 20" in length and width, while the entire present invention may measure approximately 4' in height, and 2½ in width and depth when unfolded, for example. One fishing rod holder 35 is positioned on each side of the chair. Each rod holder includes a tubular sleeve that extends outward, and is sized appropriately to accommodate the handle of virtually any model of an existing fishing rod. A cup holder 38 is also included on either side of the chair. A tubular slot 95 may be directly attached, without the use of intervening elements, to the back of the chair for conveniently holding an umbrella 39. A convenient shoulder strap 96 may also be attached to the chair for facilitating easier portability of the present invention.

In use, the folding chair with integral fishing rod holders is taken out with regular fishing gear to a river deck or lake shore. Upon reaching the destination, the user simply unfolds the chair and positions it in a desired location. With the present invention in place, the user is ready to fill the cup holder(s) with beverages, the umbrella holder with an umbrella, and most notably, the fishing pole holders with fishing poles. After the rods are cast and secured, the user sits back in the shade, relaxes with a beverage and simply waits for the fish to bite.

The present invention, as claimed, provides the unexpected and unpredictable benefit of the present invention that is convenient and easy to use, is durable yet lightweight in design, is versatile in its applications, and provides users with a convenient means of enhancing the sport of fishing. By eliminating the need to stand and hold a pole while waiting for a bite, the present invention advantageously prevents poles from being dropped, while providing a handy and comfortable seat. Since it is simple to transport and easy to operate, the present invention can improve the rate of fish caught by user by providing a more stable and efficient means of managing poles in a comfortable manner.

In use, a method for supporting a plurality of existing fishing rods during extended periods of time includes the steps of: providing a chair 20 with pivotally attached seat and back sections 21, 22; selectively articulating the seat and back sections 21, 22 between folded and unfolded positions as needed; providing and connecting a support frame 23 to the seat section 21 by spacing the support frame 23 from the back section 22; selectively adapting the support frame 23 between collapsed and extended positions as needed such that the support frame 23 lays generally coplanar with the seat and back sections 21, 22 when adapted to the collapsed position; holding the plurality of existing fishing rods adjacent to the seat section 21 in such a manner that the existing fishing rods extend upwardly and forwardly therefrom; providing and attaching a plurality of cup holders 38 to the seat section 21; providing and attaching an umbrella 39 to the back section 22; and maintaining the support frame 23 at the extended position while the seat and back sections 21, 22 are pivotally adapted between the folded and unfolded positions respectively.

In use, the method further includes the steps of: providing and pivotally coupling a plurality of tubular sleeves 35 to laterally disposed outer sides of the seat section 21; and situating closed bottom ends 37 of each of the tubular sleeves 35 subjacent to the seat section 21 by angularly offsetting a longitudinal length of the tubular sleeves 35 from a horizontal plane defined along the seat section 21.

In use, the method further includes the steps of: automatically notifying a user when a fish takes bait from at least one of the plurality of existing fishing rods such that the user is able to quickly identify which one of the existing fishing rods has been accessed by the fish.

In use, the method further includes the steps of: providing and attaching a first plurality of rectilinear guide tracks 41 to the underside of a first half 42 of the seat section 21; providing and adjustably engaging a first plurality of rectilinear rods 43 with the first guide tracks 41 respectively by displacing the first plurality of rectilinear rods 43 along the first half 42 of the seat section 21; and providing a first plurality of deformably resilient spring members 44 with opposed first and second ends 45, 46 respectively; statically conjoining each of the first ends 45 of the first plurality of spring members 44 directly to the closed end of a first one of the tubular sleeves 35; statically conjoining the second ends 46 of the first plurality of spring members 44 directly to the first plurality of rods 43 respectively; when a first one of the existing fishing rods is jerked back and forth, linearly reciprocating the first plurality of rods 43 along mutually exclusive linear travel paths defined along the first plurality of guide tracks 41 respectively; and after the first existing fishing rod is removed from the first tubular sleeve 35, returning the first plurality of spring members 44 to corresponding equilibrium positions.

In use, the method further includes the steps of: providing and attaching a second plurality of rectilinear guide tracks 50 to a second half 48 of the seat section 21 in such a manner that the first and second halves 42, 48 of the seat section 21 is mutually exclusive and non-overlapping; providing and adjustably engaging a second plurality of rectilinear rods 49 with the second plurality of guide tracks 50 respectively; providing a second plurality of deformably resilient spring members 51 with opposed first and second ends 52, 53 respectively; statically conjoining each of the first ends 52 of the second plurality of spring members 51 directly to the closed end 37 of a second one of the tubular sleeves 35; statically conjoining the second ends 53 of the second plurality of spring members 51 directly to the second plurality of the rods 49 respectively; when a second one of the existing fishing rods is jerked back and forth, linearly reciprocating the second plurality of rods 49 along mutually exclusive linear travel paths defined along the second plurality of guide tracks 50 respectively; and after the second existing fishing rod is removed from the second tubular sleeve 35, returning the second plurality of spring members 51 to corresponding equilibrium positions.

In use, the method further includes the steps of: providing and coupling a plurality of brackets 32 directly to the seat and back sections 21, 22; and providing and tethering a plurality of straps 33 directly to the seat and back sections 21, 22 for preventing the back section 22 from pivoting beyond a predetermined position with respect to the seat section.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The present invention and use of the present invention are deemed readily apparent and obvious to one skilled in the art.

What is claimed as new and what is desired to secure by Letters Patent of the United States is:

1. A multifunctional fisherman chair for supporting a plurality of existing fishing rods during extended periods of time, said multifunctional fisherman chair comprising:
    a chair having pivotally attached seat and back sections selectively articulated between folded and unfolded positions, said chair further having a support frame connected to said seat section and spaced from said back section respectively, said support frame being selectively adapted between collapsed and extended positions in such a manner that said support frame lays generally coplanar with said seat and back sections when adapted to said collapsed position; and
    means for holding the plurality of existing fishing rods adjacent to said seat section in such a manner that the existing fishing rods extend upwardly and forwardly therefrom;
    wherein said support frame is maintained at said extended position while said seat and back sections are pivotally adapted between said folded and unfolded positions respectively;
    wherein said holding means comprises:
    a plurality tubular sleeves pivotally coupled to laterally disposed outer sides of said seat section, each of said tubular sleeves having an open top end and a closed bottom end situated subjacent to said seat section such that a longitudinal length of said tubular sleeves is angularly offset from a horizontal plane defined along said seat section;
    means for automatically notifying a user when a fish takes bait from at least one of the plurality of existing fishing rods, said automatic notifying means being configured in such a manner that the user is able to quickly identify which one of the existing fishing rods has been accessed by the fish, said automatic notifying means being coupled to said tubular sleeves and an underside of said seat section respectively while remaining spaced from said support frame and said back section respectively;
    wherein said automatic notifying means further comprises:
    a first rectilinear guide track attached to said underside of a first half of said seat section;
    a first plurality of rectilinear rods adjustably engaged with said first guide track respectively and being displaced along said first half of said seat section; and
    a first plurality of deformably resilient spring members having opposed first and second ends respectively, each of said first ends of said first plurality of spring members being statically conjoined directly to said closed end of a first one of said tubular sleeves, said second ends of said first plurality of spring members being statically conjoined directly to said first plurality of rods respectively;
    wherein said first plurality of rods linearly reciprocate along mutually exclusive linear travel paths defined along said first guide track when a first one of the existing fishing rods is jerked back and forth;
    wherein said first plurality of spring members return to corresponding equilibrium positions after the first existing fishing rod is removed from said first tubular sleeve.

2. The multifunctional fisherman chair of claim 1, wherein said automatic notifying means further comprises:
    a second rectilinear guide track attached to a second half of said seat section, said first and second halves of said seat section being mutually exclusive and non-overlapping;
    a second plurality of rectilinear rods adjustably engaged with said second guide track respectively; and
    a second plurality of deformably resilient spring members having opposed first and second ends respectively, each of said first ends of said second plurality of spring members being statically conjoined directly to said closed end of a second one of said tubular sleeves, said second ends of said second plurality of spring members being statically conjoined directly to said second plurality of said rods respectively;
    wherein said second plurality of rods linearly reciprocate along mutually exclusive linear travel paths defined along said second guide track when a second one of the existing fishing rods is jerked back and forth;
    wherein said second plurality of spring members return to corresponding equilibrium positions after the second existing fishing rod is removed from said second tubular sleeve.

3. The multifunctional fisherman chair of claim 1, wherein said support frame comprises:
    first and second pivotally connected leg members having respective linear top sides directly mated with linear anterior and posterior sides of said seat section; and
    a rectilinear stabilizing brace having axially opposed ends directly and statically conjoined with oppositely disposed longitudinal sides of said second leg member.

4. The multifunctional fisherman chair of claim 1, wherein said chair comprises:
    a plurality of brackets directly coupled to said seat and back sections; and
    a plurality of straps directly tethered to said seat and back sections for preventing said back section from pivoting beyond a predetermined position with respect to said seat section.

5. A multifunctional fisherman chair for supporting a plurality of existing fishing rods during extended periods of time, said multifunctional fisherman chair comprising:

a chair having pivotally attached seat and back sections selectively articulated between folded and unfolded positions, said chair further having a support frame connected to said seat section and spaced from said back section respectively, said support frame being selectively adapted between collapsed and extended positions in such a manner that said support frame lays generally coplanar with said seat and back sections when adapted to said collapsed position;

means for holding the plurality of existing fishing rods adjacent to said seat section in such a manner that the existing fishing rods extend upwardly and forwardly therefrom;

a plurality of cup holders attached to said seat section; and an umbrella attached to said back section;

wherein said support frame is maintained at said extended position while said seat and back sections are pivotally adapted between said folded and unfolded positions respectively;

wherein said holding means comprises:

a plurality tubular sleeves pivotally coupled to laterally disposed outer sides of said seat section, each of said tubular sleeves having an open top end and a closed bottom end situated subjacent to said seat section such that a longitudinal length of said tubular sleeves is angularly offset from a horizontal plane defined along said seat section;

means for automatically notifying a user when a fish takes bait from at least one of the plurality of existing fishing rods, said automatic notifying means being configured in such a manner that the user is able to quickly identify which one of the existing fishing rods has been accessed by the fish, said automatic notifying means being coupled to said tubular sleeves and an underside of said seat section respectively while remaining spaced from said support frame and said back section respectively;

wherein said automatic notifying means further comprises:

a first rectilinear guide track attached to said underside of a first half of said seat section;

a first plurality of rectilinear rods adjustably engaged with said first guide track respectively and being displaced along said first half of said seat section; and a first plurality of deformably resilient spring members having opposed first and second ends respectively, each of said first ends of said first plurality of spring members being statically conjoined directly to said closed end of a first one of said tubular sleeves, said second ends of said first plurality of spring members being statically conjoined directly to said first plurality of rods respectively;

wherein said first plurality of rods linearly reciprocate along mutually exclusive linear travel paths defined along said first guide track when a first one of the existing fishing rods is jerked back and forth;

wherein said first plurality of spring members return to corresponding equilibrium positions after the first existing fishing rod is removed from said first tubular sleeve.

6. The multifunctional fisherman chair of claim 5, wherein said automatic notifying means further comprises:

a second rectilinear guide track attached to a second half of said seat section, said first and second halves of said seat section being mutually exclusive and non-overlapping;

a second plurality of rectilinear rods adjustably engaged with said second guide track respectively; and a second plurality of deformably resilient spring members having opposed first and second ends respectively, each of said first ends of said second plurality of spring members being statically conjoined directly to said closed end of a second one of said tubular sleeves, said second ends of said second plurality of spring members being statically conjoined directly to said second plurality of said rods respectively;

wherein said second plurality of rods linearly reciprocate along mutually exclusive linear travel paths defined along said second guide track when a second one of the existing fishing rods is jerked back and forth;

wherein said second plurality of spring members return to corresponding equilibrium positions after the second existing fishing rod is removed from said second tubular sleeve.

7. The multifunctional fisherman chair of claim 5, wherein said support frame comprises:

first and second pivotally connected leg members having respective linear top sides directly mated with linear anterior and posterior sides of said seat section; and a rectilinear stabilizing brace having axially opposed ends directly and statically conjoined with oppositely disposed longitudinal sides of said second leg member.

8. The multifunctional fisherman chair of claim 5, wherein said chair comprises:

a plurality of brackets directly coupled to said seat and back sections; and a plurality of straps directly tethered to said seat and back sections for preventing said back section from pivoting beyond a predetermined position with respect to said seat section.

9. A method for supporting a plurality of existing fishing rods during extended periods of time, said method comprising the steps of:

a. providing a chair having pivotally attached seat and back sections;

b. selectively articulating said seat and back sections between folded and unfolded positions as needed;

c. providing and connecting a support frame to said seat section by spacing said support frame from said back section;

d. selectively adapting said support frame between collapsed and extended positions as needed such that said support frame lays generally coplanar with said seat and back sections when adapted to said collapsed position;

e. holding the plurality of existing fishing rods adjacent to said seat section in such a manner that the existing fishing rods extend upwardly and forwardly therefrom;

f. providing and attaching a plurality of cup holders to said seat section;

g. providing and attaching an umbrella to said back section; and h. maintaining said support frame at said extended position while said seat and back sections are pivotally adapted between said folded and unfolded positions respectively;

wherein step e. comprises the steps of:

providing and pivotally coupling a plurality tubular sleeves to laterally disposed outer sides of said seat section; and situating closed bottoms ends of each of said tubular sleeves subjacent to said seat section by angularly offsetting a longitudinal length of said tubular sleeves from a horizontal plane defined along said seat section;

automatically notifying a user when a fish takes bait from at least one of the plurality of existing fishing rods such that the user is able to quickly identify which one of the existing fishing rods has been accessed by the fish;

providing and attaching a first rectilinear guide track to said underside of a first half of said seat section;

providing and adjustably engaging a first plurality of rectilinear rods with said first guide track respectively by displacing said first plurality of rectilinear rods along said first half of said seat section; and providing a first plurality of deformably resilient spring members having opposed first and second ends respectively;

statically conjoining each of said first ends of said first plurality of spring members being directly to said closed end of a first one of said tubular sleeves;

statically conjoining said second ends of said first plurality of spring members directly to said first plurality of rods respectively;

when a first one of the existing fishing rods is jerked back and forth, linearly reciprocating said first plurality of rods along mutually exclusive linear travel paths defined along said first guide track respectively; and after the first existing fishing rod is removed from said first tubular sleeve, returning said first plurality of spring members to corresponding equilibrium positions.

10. The method of claim 9, further comprising the steps of:

providing and attaching a second rectilinear guide track to a second half of said seat section in such a manner that said first and second halves of said seat section being mutually exclusive and non-overlapping;

providing and adjustably engaging a second plurality of rectilinear rods with said second guide track respectively;

providing a second plurality of deformably resilient spring members having opposed first and second ends respectively;

statically conjoining each of said first ends of said second plurality of spring members directly to said closed end of a second one of said tubular sleeves;

statically conjoining said second ends of said second plurality of spring members directly to said second plurality of said rods respectively;

when a second one of the existing fishing rods is jerked back and forth, linearly reciprocating said second plurality of rods along mutually exclusive linear travel paths defined along said second guide track; and after the second existing fishing rod is removed from said second tubular sleeve, returning said second plurality of spring members to corresponding equilibrium positions.

11. The method of claim 9, wherein step a. comprises the steps of:

providing and coupling a plurality of brackets directly to said seat and back sections; and providing and tethering a plurality of straps directly to said seat and back sections for preventing said back section from pivoting beyond a predetermined position with respect to said seat section.

\* \* \* \* \*